United States Patent [19]

Jäger et al.

[11] Patent Number: 6,016,055
[45] Date of Patent: Jan. 18, 2000

[54] DEVICE FOR INCREASING THE MAGNETIC FLUX DENSITY IN THE VICINITY OF A HALL SENSOR COOPERATING WITH A MAGNET WHEEL

[75] Inventors: Heimo Jäger, Wr. Neudorf; Werner Köstler, Vienna, both of Austria

[73] Assignee: Siemens Aktiengesellschaft, Munich, Germany

[21] Appl. No.: 08/906,183

[22] Filed: Aug. 4, 1997

Related U.S. Application Data

[63] Continuation of application No. PCT/DE96/00153, Feb. 1, 1996.

[30] Foreign Application Priority Data

Feb. 2, 1995 [DE] Germany .................. 195 03 376

[51] Int. Cl.[7] ................ G01P 3/52; G01B 7/30
[52] U.S. Cl. ............... 324/165; 324/207.2; 324/207.25; 324/174
[58] Field of Search ............... 324/207.2, 207.23, 324/207.25, 207.26, 166, 167, 173, 174, 175, 165; 338/32 H

[56] References Cited

U.S. PATENT DOCUMENTS

| | | | |
|---|---|---|---|
| 4,110,676 | 8/1978 | Edick et al. ............... | 324/164 |
| 4,857,784 | 8/1989 | Mukaekubo ............... | 310/68 B |
| 5,070,298 | 12/1991 | Honda et al. ............... | 324/207.2 |
| 5,444,369 | 8/1995 | Luetzow ............... | 324/207.2 |
| 5,543,672 | 8/1996 | Nishitani et al. ............... | 324/174 |

FOREIGN PATENT DOCUMENTS

| | | | |
|---|---|---|---|
| 0363738B1 | 4/1990 | European Pat. Off. . | |
| 0575971A1 | 12/1993 | European Pat. Off. . | |
| 2647818 | 4/1978 | Germany ............... | 324/207.2 |
| 9106064 | 10/1992 | Germany . | |
| 0464755 | 12/1968 | Switzerland ............... | 324/207.2 |
| 1580153 | 7/1990 | U.S.S.R. ............... | 324/207.2 |

*Primary Examiner*—Jay Patidar
*Attorney, Agent, or Firm*—Herbert L. Lerner; Laurence A. Greenberg

[57] ABSTRACT

A device for measuring the rotation speed or detecting the direction of rotation of a rotary magnetic field includes a Hall sensor which is mounted as an SMD component on a printed circuit board. A magnet wheel is secured to a rotor spindle of an electric motor and a rotary magnetic field is generated upon its rotation. A magnetic flux guide element is provided for concentrating the rotary magnetic field in the region of the Hall sensor, thereby increasing the sensitivity of the Hall sensor.

5 Claims, 3 Drawing Sheets

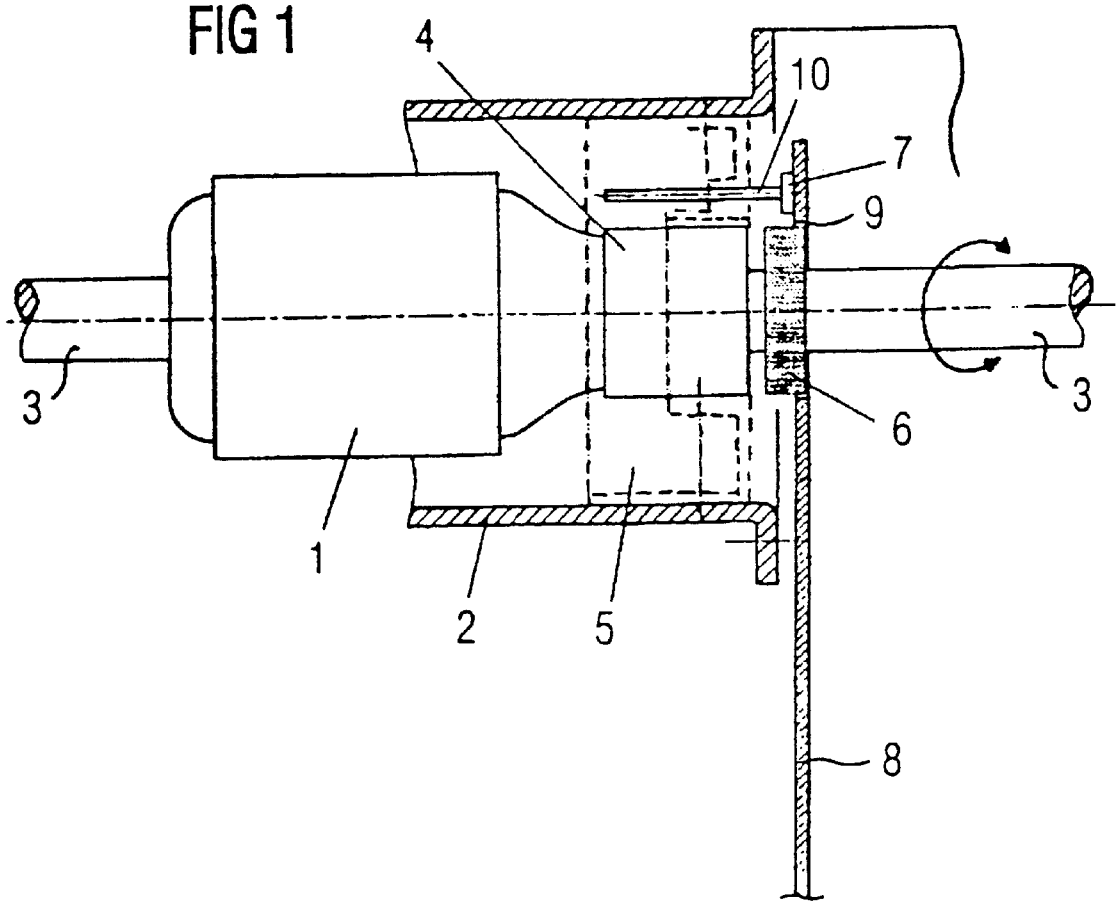
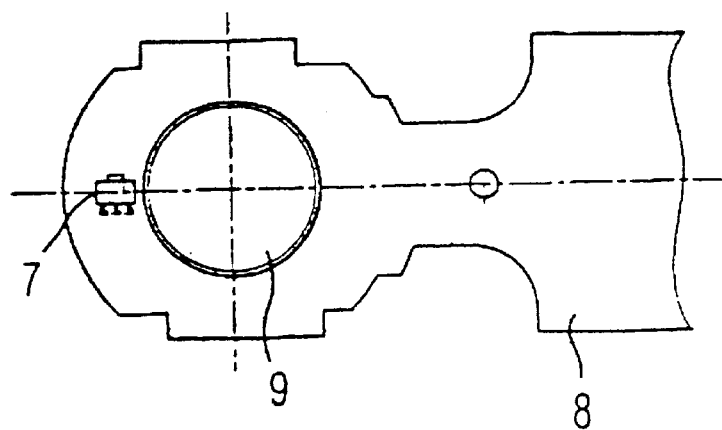

DEVICE FOR INCREASING THE MAGNETIC FLUX DENSITY IN THE VICINITY OF A HALL SENSOR COOPERATING WITH A MAGNET WHEEL

CROSS-REFERENCE TO RELATED APPLICATION

This application is a continuation of application Ser. No. PCT/DE96/00153, filed Feb. 1, 1996.

BACKGROUND OF THE INVENTION

Field of the Invention

The invention relates to a device for measuring the rotation speed or detecting the direction of rotation of a rotary magnetic field.

A device that is known from European Patent 0 363 738 B1 has a holder that holds the Hall sensor in such a way that a magnetic field can readily be detected. The Hall sensor is connected to an evaluation circuit on a printed circuit board through electrical contacts that are passed through the holder. However, such a holder is very complicated and expensive to produce. Moreover, the Hall sensor requires complicated adjustment.

Another device for measuring the rotation speed or detecting the direction of rotation of a rotary magnetic field, which is known from U.S. Pat. No. 4,110,676, has a rotating rotor spindle on which a magnet wheel is secured. The north and south poles of the magnet wheel are disposed in such a way that the direction of magnetization and therefore the magnetic field are oriented radially. In addition, a magnetic flux guide element which is provided parallel to the field lines focuses the magnetic field lines onto a Hall sensor. In that device, the Hall sensor must be disposed perpendicular to the field lines and to the magnetic flux guide element. The magnetic field lines are not deflected by the magnetic flux guide element.

In an electric motor with a rotary field measurement between a rotor-side magnet field with magnet poles in a plane perpendicular to a rotor axis and a Hall element on a printed circuit board, which is known from U.S. Pat. No. 4,857,784, a sensor surface is disposed perpendicular to a printed circuit board and closely parallel to a circumferential surface of a magnet wheel. The printed circuit board lies radially inside a fixing edge of a bearing receptacle, which for its part is introduced in an assembled motor in a rotating matched receptacle edge of a motor housing of the electric motor.

German Utility Model DE 91 06 064 U1 discloses a device in which a permanent magnet that has a plurality of north and south poles is secured to a rotor axis. Two disk-like magnetic flux guide elements are disposed between the north and south poles, each having one north pole and one south pole, so that a magnetic field is generated between them. A Hall sensor that measures the direction of magnetization is disposed in the magnetic field. In that device, the magnetic flux guide elements are used to form poles of the magnets.

SUMMARY OF THE INVENTION

It is accordingly an object of the invention to provide a device for measuring the rotation speed or detecting the direction of rotation of a rotary magnetic field, which overcomes the hereinafore-mentioned disadvantages of the heretofore-known devices of this general type and which is simple in structure.

With the foregoing and other objects in view there is provided, in accordance with the invention, a device for measuring the rotation speed or detecting the direction of rotation of a rotary magnetic field, comprising: a rotating rotor spindle; a magnet wheel secured on the rotor spindle, the magnet wheel having a permanent magnet with magnet poles for generating a rotary magnetic field, the poles disposed in a radial plane perpendicular to the rotor spindle; a printed circuit board disposed approximately perpendicular to the rotor spindle for receiving an electronic circuit; a Hall sensor secured as an integrated component on the printed circuit board, the Hall sensor having a sensor surface extended parallel to the printed circuit board; and an axial magnetic flux guide element of high permeability disposed in the vicinity of the magnet wheel and substantially perpendicular to the sensor surface of the Hall sensor, for deflecting the magnetic field of the magnet wheel in axial direction to increase magnetic flux density in the vicinity of the Hall sensor.

In the device of the invention, the Hall sensor is constructed as an IC and is secured to the printed circuit board. In order for the field lines of the rotary magnetic field to be concentrated in the region of the Hall sensor, the magnetic flux guide element attracts the field lines of the rotary magnetic field and carries them vertically through the sensor surface of the Hall sensor.

In accordance with another feature of the invention, there is provided an electric motor armature carried on the rotor spindle.

In accordance with a further feature of the invention, the magnetic flux guide element is made from a soft magnetic material.

In accordance with an added feature of the invention, the printed circuit board has a hole formed therein in which the rotor spindle and the magnet wheel are disposed.

In accordance with a concomitant feature of the invention, the magnet wheel has an annular shape.

Other features which are considered as characteristic for the invention are set forth in the appended claims.

Although the invention is illustrated and described herein as embodied in a device for measuring the rotation speed or detecting the direction of rotation of a rotary magnetic field, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, sectional view of a device according to the invention;

FIG. 2 is a plan view of a printed circuit board of the device of the invention;

DESCRIPTION OF THE PREFERRED EMBODIMENTS

Figure 3:
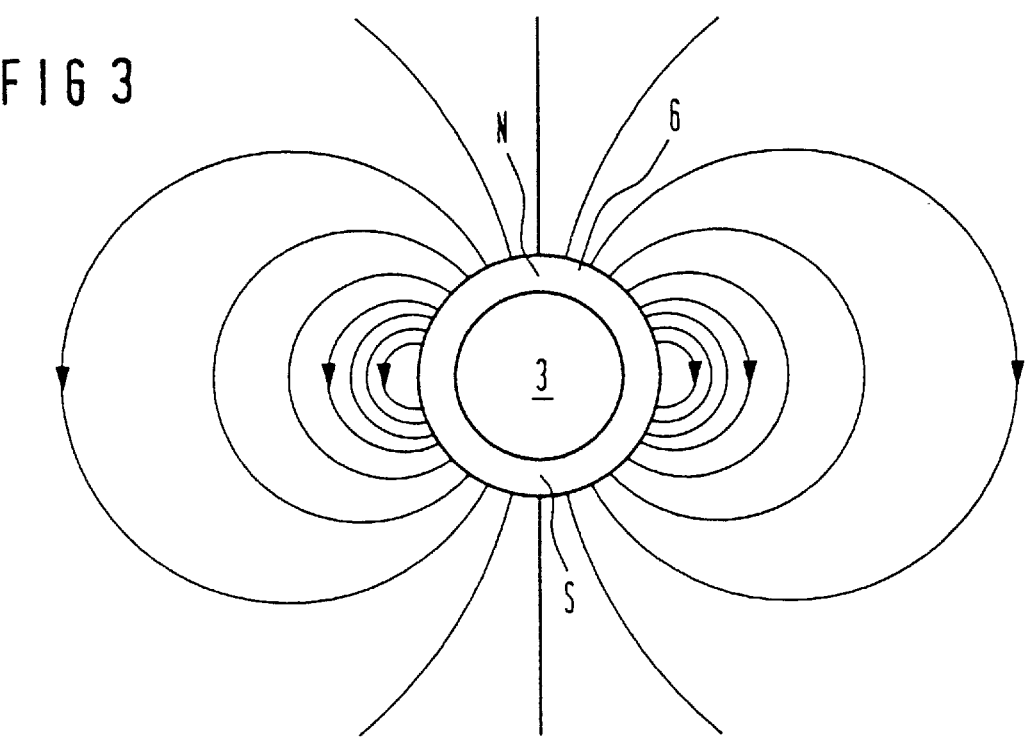
FIGS. 3–5 are views of magnetic field line courses in the device of FIG. 1.

Electric window operating mechanisms of motor vehicles are driven by electric motors. It is necessary to detect the rpm of the electric motor and its direction of rotation for the sake of reliable closing and the detection of any objects that may be caught. A device with a Hall sensor and a corresponding evaluation circuit is used to detect the rpm or the direction of rotation. Hall sensors are already well known and need not be described in detail herein.

Referring now to the figures of the drawings in detail and first, particularly, to FIG. 1 thereof, there is seen a section through a device according to the invention for measuring the rotation speed or detecting the direction of rotation of a rotary magnetic field. This device has an electric motor, although only a rotor 1, which is also known as an armature, and part of a motor housing 2 thereof are shown in FIG. 1 for the sake of simplicity.

The rotor 1 is connected to a rotor spindle 3. A non-illustrated armature winding is supplied with electric current through a collector 4. To that end, the collector 4 is surrounded by a brush plate 5 which has carbon or graphite brushes having compression springs and sliding on the collector 4. Thus, the current can be carried to the armature winding through current connections of the brush plate 5. The rotor 1 rotates at a particular angular speed when the armature winding is supplied with current.

An annular magnet wheel 6, which is constructed in the form of a permanent magnet, is also secured to the rotor spindle 3. This magnet wheel 6 has at least one pair of magnet poles, specifically one magnetic north pole N and one magnetic south pole S each. As soon as the rotor spindle 3 rotates, the magnet wheel 6 rotates as well, and with it a magnetic field generated by the permanent magnet. A rotary magnetic field is consequently generated.

This rotary magnetic field is detected by a Hall sensor 7. A Hall voltage which is generated by the Hall sensor 7 and is a measure for the magnetic field intensity that is detected, is supplied to an electronic circuit on a printed circuit board 8, and processed there. The rpm or the direction of rotation of the electric motor can be detected in this way, depending on the course of the Hall voltage over time. The electric motor can be controlled as needed with the aid of the rpm or the direction of rotation.

The printed circuit board 8 shown in FIG. 2 has a hole 9 through which the rotor spindle 3 is inserted upon assembly. The brush plate 5 is also secured to the printed circuit board 8. Consequently, an electric current for the armature winding can be carried through the printed circuit board 8 and the brush plate 5 to the collector 4.

The Hall sensor 7 is constructed as an integrated component, having a sensor surface which is accommodated in a housing. By way of example, the Hall sensor 7 can be accommodated in an SMD housing (surface mounted device). The sensor surface is disposed parallel to the printed circuit board 8. When the printed circuit board 8 is plugged over the rotor spindle 3 for assembly, the magnet wheel 6 is located in or at the hole 9. The Hall sensor 7 is located directly next to the magnet wheel 6.

The rotary magnetic field is generated when the rotor spindle 3 rotates. In FIG. 3, magnetic field lines are shown in a sectional plane parallel to the magnet wheel 6. The field lines lead from the north pole N to the south pole S. If there is no external influence, they are formed symmetrically to the magnet wheel 6.

Figure 4:
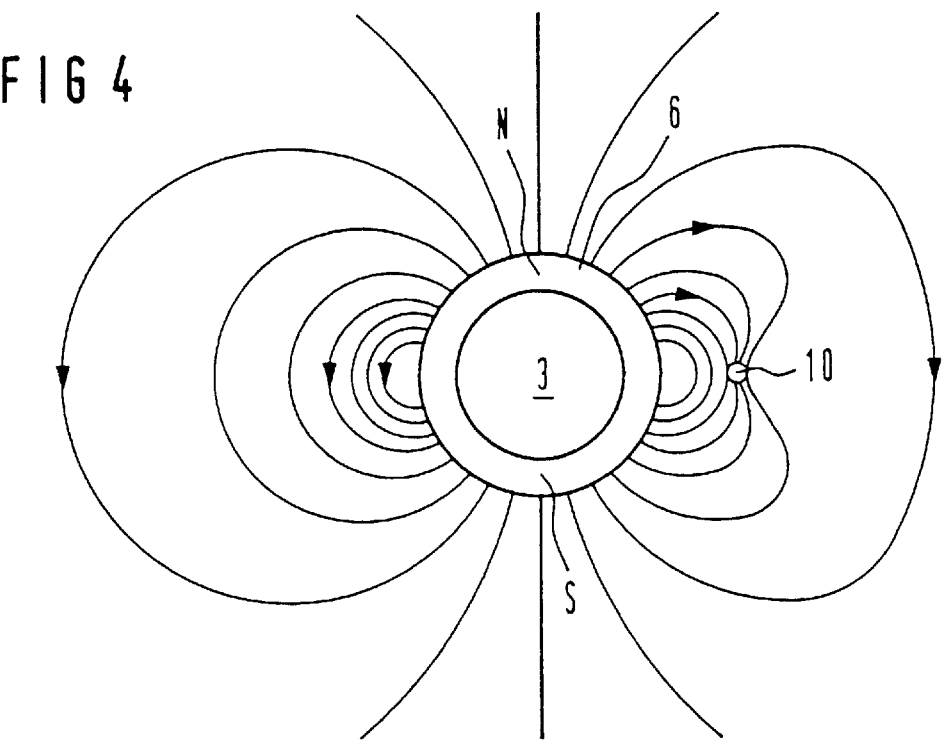
Figure 5:
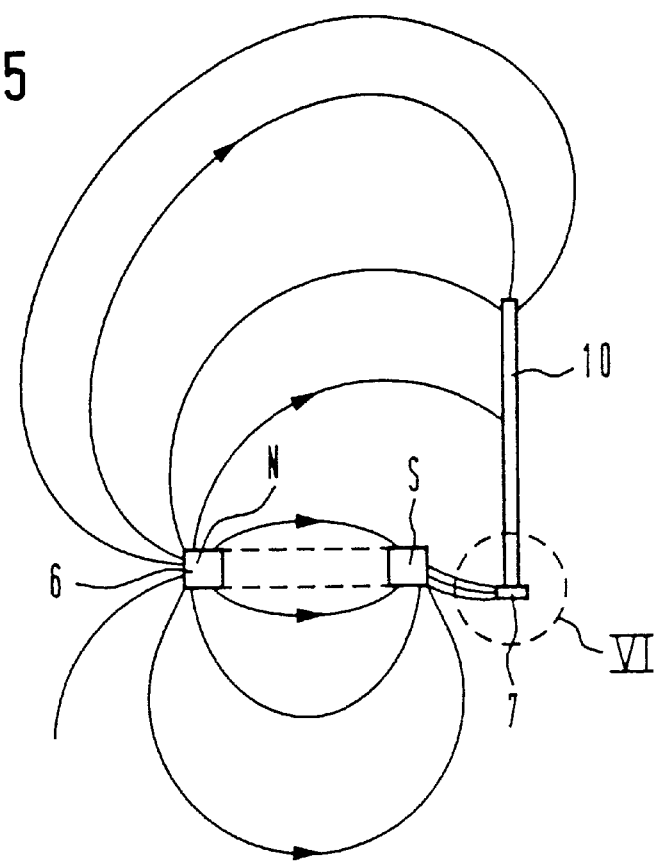
Figure 6:
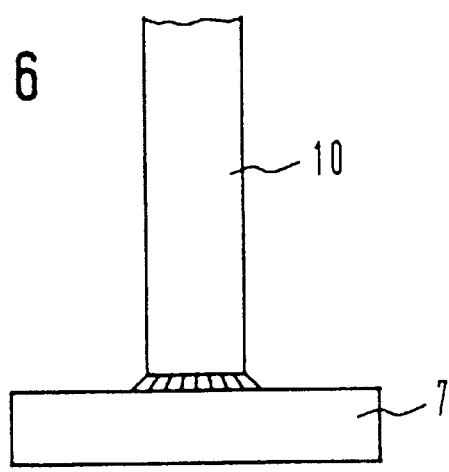
FIG. 6 is an enlarged, fragmentary, elevational view of a Hall sensor and a magnetic flux guide element in a circular portion VI of FIG. 5.

The Hall sensor 7 is disposed on the printed circuit board 8 in such a way that it is located in the vicinity of the hole 9 and of the magnet wheel 6, so that as many field lines as possible, and thus as large a magnetic field as possible, can be detected by the Hall sensor 7. In order to increase the sensitivity of the Hall sensor 7, or in other words to generate a greater magnetic flux transversely to the sensor surface, according to the invention a magnetic flux guide element 10 is disposed in such a way that the magnetic field lines are concentrated in the region of the Hall sensor 7, as is seen in FIGS. 4, 5 and 6.

This guide element 10 is formed of a ferromagnetic material, or in other words one with a high permeability $\mu$, as a result of which a high magnetic flux density is attained inside the guide element 10. Iron, nickel or known alloys thereof may, for example, be used as the material. Among these materials, soft magnetic materials are especially suitable, since they have only a slight coercive field strength.

The guide element 10 is disposed in the vicinity of the magnet wheel 6 and the Hall sensor 7, so that the highest possible magnetic flux density will occur in the guide element 10. One end of the guide element 10 is located near the Hall sensor 7 with its sensor surface, as is seen in FIGS. 5 and 6. As is clearly shown in FIG. 6, the field lines at the end of the guide element 10 have a substantially higher density in comparison to the device without any magnetic flux guide element, as is seen in FIGS. 3 and 4. The closer the sensor surface is brought to the guide element 10, the more field lines will intersect the sensor surface and thus the more sensitive the Hall sensor 7 will become.

In FIG. 1, the guide element 10 is shown in the form of a pin or wire. The guide element may be secured to the housing of the SMD Hall sensor 7. Various other embodiments are also possible in which the magnetic field lines are concentrated in the vicinity of the sensor surface and the magnetic flux density is thus increased. For example, the guide element 10 may also be secured to the brush plate 5 or to the printed circuit board 8.

It is only the function of the guide element 10, and not its structure, which is essential to the invention, specifically the concentration of the magnetic field in the region of the sensor surface. As a result, it is possible to detect the rpm or direction of rotation with greater sensitivity. Even low rpm or only slight changes in the direction of rotation can be detected immediately.

In order to detect the direction of rotation, it is advantageous if a plurality of Hall sensors are distributed around the magnet wheel 6 on the printed circuit board 8. If the Hall sensor 7 is mounted as an SMD component directly on the printed circuit board 8, then all of the components including the Hall sensor 7 can be soldered to the printed circuit board 8 in a simple manner, in one operation. Since the Hall sensor 7 is soldered to the printed circuit board 8, a sturdy construction is provided, which is not vulnerable to jarring of the kind that is usual in a motor vehicle. A device of this kind according to the invention thus also assures fast assembly of the overall device.

If the electrical connection between the brush plate 5 and the printed circuit board 8 is constructed as a plug connection, then the printed circuit board 8 can be slipped onto the rotor spindle 3 without major effort. If the electrical connection between the two parts is constructed as a soldered connection, then the brush plate 5 together with the printed circuit board 8 can be slipped as a single component over the electric motor.

We claim:

1. A device for measuring the rotation speed or detecting the direction of rotation of a rotary magnetic field, comprising:

a rotating rotor spindle;

a magnet wheel secured on said rotor spindle, said magnet wheel having a permanent magnet with magnet poles for generating a rotary magnetic field, said poles disposed in a radial plane perpendicular to said rotor spindle;

a printed circuit board disposed approximately perpendicular to said rotor spindle for receiving an electronic circuit;

a Hall sensor secured as an integrated component on said printed circuit board, said Hall sensor having a sensor surface extended parallel to said printed circuit board; and a magnetic flux guide element of high permeability disposed in the vicinity of said magnet wheel and substantially perpendicular to said sensor surface of said Hall sensor, for deflecting the magnetic field of said magnet wheel in an axial direction to increase magnetic flux density in the vicinity of said Hall sensor, said magnetic flux guide element extending in an axial direction along an imaginary longitudinal axis and disposed so that the axis passes through said surface of said Hall sensor.

2. The device according to claim 1, including an electric motor armature carried on said rotor spindle.

3. The device according to claim 1, wherein said magnetic flux guide element is made from a soft magnetic material.

4. The device according to claim 1, wherein said printed circuit board has a hole formed therein in which said rotor spindle and said magnet wheel are disposed.

5. The device according to claim 1, wherein said magnet wheel has an annular shape.

\* \* \* \* \*